INVENTORS
SHIGERU TSUJI
KAZUTAMI HAYASHI
BY KOUICHI KADOWAKI
KATSUO SATO
OSTROLENK, FABER, GERB & SOFFEN
ATTORNEYS

United States Patent Office 3,436,201
Patented Apr. 1, 1969

3,436,201
DEVICE FOR GLASS GLAZING ELECTRONIC HOUSING MEMBERS
Shigeru Tsuji, Kazutami Hayashi, Kouichi Kadowaki, and Katsuo Sato, Tokyo, Japan, assignors to Nippon Electric Company, Limited, Tokyo, Japan
Continuation-in-part of application Ser. No. 287,863, June 14, 1963, now Patent No. 3,308,525. This application Jan. 12, 1967, Ser. No. 608,885
Claims priority, application Japan, June 16, 1962, 37/25,188
Int. Cl. C03b 23/20, 9/44
U.S. Cl. 65—155                         11 Claims

ABSTRACT OF THE DISCLOSURE

This invention describes novel apparatus useful in the encapsulation and hermetic sealing of sensitive components such as, for example, semiconductor devices, transistors, integrated circuits, and so forth. Apparatus is provided for either fully automatically or semiautomatically sorting the encapsulation members as to ranges of thickness, glazing substantially large batches of the encapsulation members along their mating surfaces by virtue of a loading, heating and cooling operation; for performing the final encapsulation procedure including a heating phase, which procedure is capable of performing encapsulation on large batches of devices. Additional methods and apparatus are provided for subsequent procedures such as testing for air tightness, marking to indicate the identification of leads, and mounting for expediting handling, shipping and assembly activities.

---

The instant invention relates to encapsulation devices, and more particularly to novel apparatus for hermetically sealing semiconductor components and the like within a ceramic assembly, which apparatus carries out a method that is well adapted to assembly line techniques. This application is a continuation-in-part of copending application Ser. No. 287,863, filed June 14, 1963 now U.S. Patent No. 3,308,525.

Engineering technology in the field of electronics is making rapid strides in many technological areas within the broad scope of the electronics art. One very progressive area is that of miniaturization and even microminiaturization of electronic devices, as well as entire circuits. Active elements such as semiconductors and transistors, as well as passive elements such as capacitors, resistors and inductor are capable of being miniaturized to such a degree so that entire circuits comprised of a combination of the above mentioned elements may be formed on a single wafer or slab of material whose length, width and thickness dimensions may be of the order of millimeters or less.

Such devices which are commonly referred to as integrated circuits, have been found to yield excellent performance characteristics with the proviso that the devices be hermetically sealed within a housing so as to prevent deterioration and even destruction of the circuitry as a result of exposure to harmful external influences. Since the operating characteristics of present day miniaturized components have been found to be extremely sensitive to external conditions, it is important that these miniaturized circuits and/or components be capable of being hermetically encapsulated through the use of inexpensive and yet simple and reliable apparatus so as to yield an encapsulated assembly which is substantially insensitive to harmful external influences for an indefinite period of time.

One highly satisfactory means for encapsulating electronic devices is that of providing two mating metallic or ceramic members which may be glazed together by a suitable glass material placed along their mating surfaces which hermetically seal the electronic components contained within the members except for protruding leads projecting beyond the exterior of the housing members for connection into an electrical circuit.

It is very important to provide a glass sealing material which will not deteriorate or in any way contaminate the electronic components within the housing; which has a temperature coefficient of expansion quite close to that of the housing members, and which is capable of fusing at a low temperature level so as to be incapable of having any harmful effects upon the encapsulated electronic components.

The instant invention is characterized by providing an apparatus for glazing the housing components and for encapssulating miniature electron devices between mating components so glazed wherein the handling and assembling operations may be performed in a simple and high-speed (i.e., assembly line) manner.

It is therefore one object of the instant invention to provide novel apparatus for glazing housing bodies which are used for encapsulating miniature electronic devices and circuits.

Another object of the instant invention is to provide novel apparatus for enabling high-speed, low-cost encapsulation of miniature electronic devices and circuits.

These and other objects of the instant invention will become apparent when reading the accompanying description and drawings in which.

Figures 1, 1A, 2, 2A, 3A:
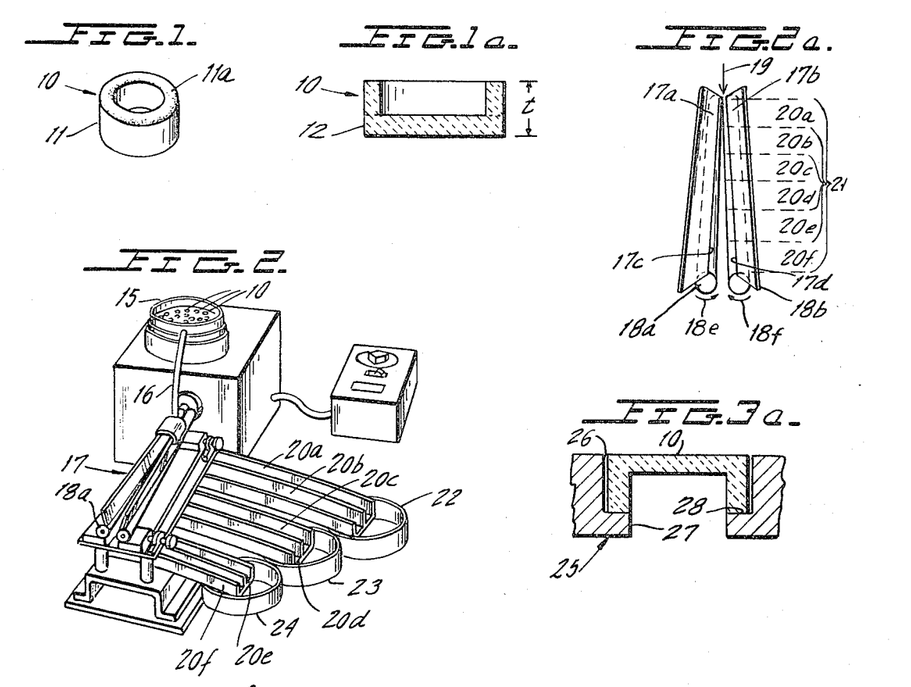
FIGURE 1 is a perspective view showing ceramic caps prior to the glazing operation.
FIGURE 1a is a sectional view of one of the ceramic caps of FIGURE 1.
FIGURE 2 is a perspective view of a sorting machine for sorting the ceramic caps into various thickness ranges.
FIGURE 2a is a top view of the sorting machine of FIGURE 2.
FIGURE 3a is a sectional view of a portion of one jig shown in FIGURE 3.

Referring now to the drawings; FIGURE 1 shows a plurality of ceramic caps 10 each having a cylindrical portion 11 of relatively short height and a substantially disc-shaped member base portion 12, where the height of the overall cup-shaped member lies within a predetermined range of thickness $t$ (see FIGURE 1a). The cap is formed of refractory insulating material such as a ceramic. Suitable ceramic materials which may be employed may be taken from the group consisting of steatite, alumina and forsterite.

The cap members 10 may be formed as unitary members or conversely may be formed through the operation of joining a disc-shaped member, such as 12, to a substantially ring-shaped member, such as member 11, by any suitable joining process. Preferably, however, the cup-shaped members are formed as unitary members and are not formed from two separate members, namely, a cylindrical shape and a disc-shaped member. However, such choice may, if desired, depend upon the needs of the user. In one preferred encapsulation procedure the three thickness ranges were:

$t_1$=0.55–0.60 millimeters;
$t_2$=0.60–0.65 millimeters;
$t_3$=0.65–0.70 millimeters.

The sorting procedure is preferably carried out through automatic means such as that shown in FIGURES 2 and 2a, wherein a large number of ceramic caps are deposited into a hopper 15. A suitable vibrator mechanism (not shown) mounted beneath hopper 15 causes the caps to vibrate and through vibration, to pass through a suitable opening in hopper 15 and downwardly through tubing 16 so as to fall between two elongated flat members 17a and 17b arranged in inclined fashion so as to form a trough 17 which causes the ceramic caps to be fed toward the center region between the lower edges of members 17a and 17b. The respective lower edges are inclined toward one another at the feed end of the caps indicated in FIGURE 2a by arrow 19. The opening is narrowest at the higher end and widens to the lower end relative to FIGURE 2 so that the caps whose thicknesses are greater than the width of the opening at the higher end will continue to slide downwardly by gravity along the inclined trough until the opening is of suitable thickness to permit the caps to freely drop therebetween. Positioned immediately beneath the sides 17a and 17b of the trough are two elongated roller members 18a and 18b which are rotatably mounted by suitable means (not shown) and have their longitudinal axes substantially parallel to the lower edges of the associated sides 17a and 17b, respectively, so as to form the same tapered opening formed by the trough sides 17a and 17b. The roller members facilitate the dropping of the ceramic caps between the trough. The roller members are driven by a motor means (not shown) mounted within the housing located beneath hopper 15 which has its output shaft (not shown) mechanically coupled by means, not shown, to the elongated rollers causing them to rotate counterclockwise and clockwise, respectively, as shown by the arrows 18e and 18f, respectively. This rotating motion facilitates the alignment of the ceramic caps so as to further facilitate the dropping of the ceramic caps between the rollers into suitable inclined slides and selecting thickness ranges of ceramic caps. The inclines or slides 20a–20f are mounted immediately beneath the rollers and are each divided from one another by a plurality of partitions or walls 21. The caps being passed near the feed end and which drop through so as to slide down slides 20a and 20b would, for example, be those in thickness range $t_1$. In a similar fashion, the caps sliding down slides 20c and 20d would be in the thickness range $t_2$ while the final thickness range $t_3$ would be constituted by those caps sliding down slides 20e and 20f. As shown in FIGURE 2, there is provided therein a glass or other clean receptacle 22–24 for each of the thickness ranges $t_1$–$t_3$, respectively.

The purpose for sorting the ceramic caps within predetermined thickness ranges is to guarantee uniform glazing of the caps. If the glazing of the caps was performed upon caps having thicknesses within a broad range, some caps would be well glazed whereas other caps may not be glazed at all. By suitably arranging the thicknesses, uniform glazing of all caps can thereby be readily and easily obtained.

Figures 3, 4A:
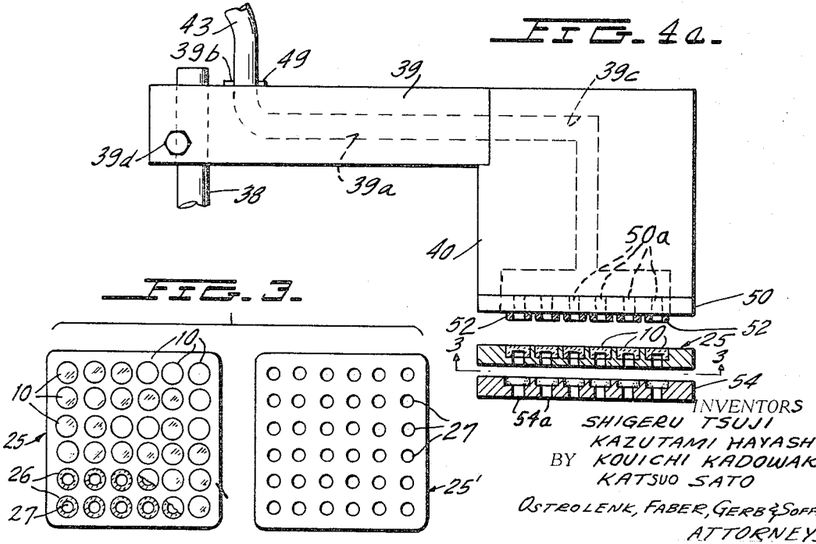
FIGURE 3 is a perspective view showing two jigs loaded with ceramic caps of the type shown in FIGURE 1.
FIGURE 4a is an elevational view showing the vacuum chuck portion of the apparatus of FIGURE 4.

Each receptacle such as the receptacle 22 of sorted ceramic caps is now ready for the glazing operation. Preparatory to actual performance of the glazing operation, the caps of a receptacle are loaded into a jig 25, as shown in FIGURE 3. The jig 25 is provided with a plurality of equal sized openings 26 arranged in a regular 6 x 6 matrix so as to be capable of receiving a total of 36 ceramic caps. It should be understood that whereas the jig shows a capacity for receiving 36 caps, any greater or lesser number is permissible, depending only upon the needs of the user and the actual capacity of the jig lends no novelty to the device of the instant invention.

FIGURE 3a shows a cross sectional view of one of the openings provided in the jigs 25 and 25', shown in FIGURE 3. Jig, or carrier, 25, is shown with openings 26 containing the ceramic caps 10 which are mounted in a manner best seen in FIGURE 3a. The underside of the jig 25 is shown in FIGURE 3a by jig 25' as having smaller diameter openings 27. Openings 26 and 27 form a shoulder 28 therebetween for supporting the ceramic caps. Caps of the same thickness range are loaded into a jig with the jig in the position shown as 25 in FIGURE 3. It should be understood that the jig is shown in its overturned position 25' only for purposes of clarity and that the jigs are not employed during the glazing process in this position, but are employed in a position as shown by jig 25 which is shown partially loaded with ceramic cap members positioned in the same manner shown in FIGURE 3a.

FIGURES 4–8 are perspective views showing the glazing apparatus 30 which is comprised of a base plate 31 supporting a working surface plate 32 by spacers 33 secured between the two plates by suitable fastening means 33a. Plate 32 is provided with an opening 34 for receiving the upper end of a heating source such as, for example, a Bunsen burner 35 whose flame appears at 35a and which is connected to a gas source by means of supply tube 36.

Figure 4:
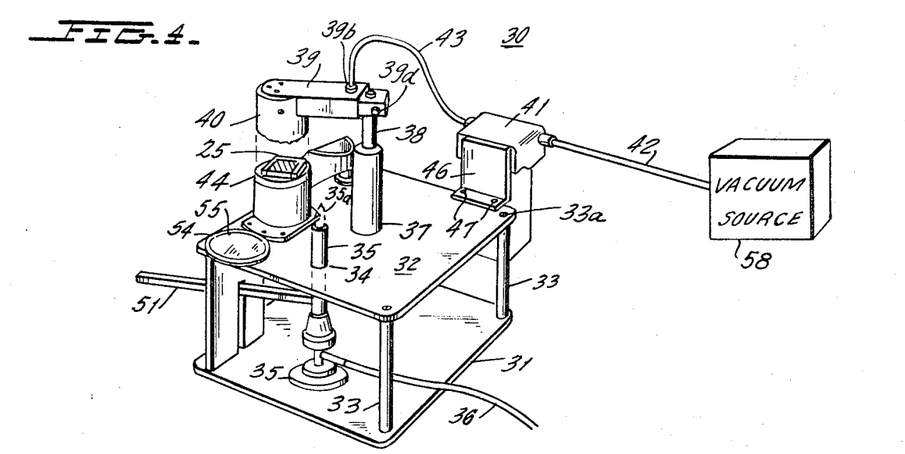
FIGURE 4 is a perspective view showing the apparatus employed for glazing ceramic caps of the type shown in FIGURE 1.
Figure 5:
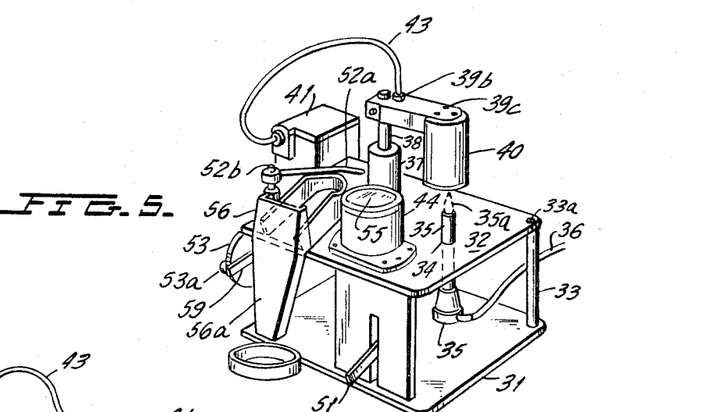
FIGURES 5–8 are perspective views of the glazing apparatus showing the various steps of the glazing operation.
Figure 6:
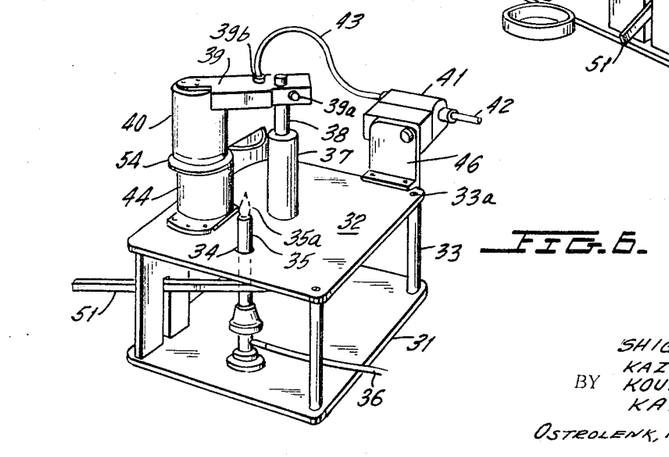
Figure 7:
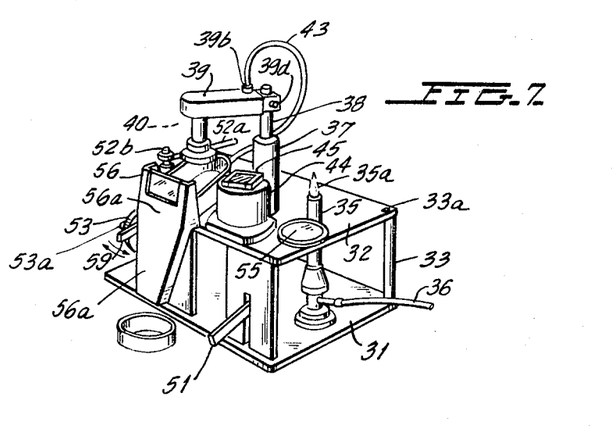
Figure 8:
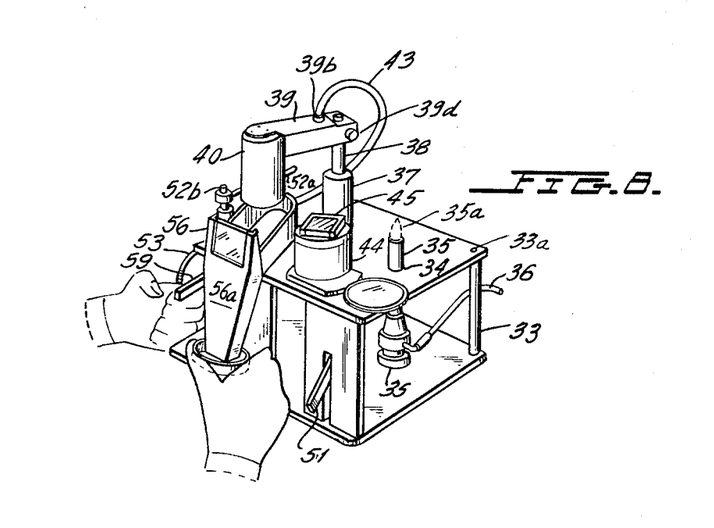

An elongated cylinder 37 is rigidly secured to plate 32 and is provided with a centrally located opening for receiving rod 38 which is both reciprocally and rotatably movable relative to cylinder 37 by operating handle 53. A support arm 39 is provided with an aperture for receiving the upper end of rod 38 and is rigidly clamped thereto by fastening means 39d.

A vacuum source 58 is coupled to a drain means 41 secured to plate 32 by bracket 46 and fastening means 47. The outlet port of the drain means 41 is coupled through tubing 43 to an inlet port 39b provided in arm 39. Arm 39 and depending cylindrical shaped member 40, fastened to arm 39 by suitable fastening means (not shown), form the vacuum chuck which operates in a manner to be more fully described.

Referring to FIGURE 4a, the internal construction of members 39 and 40, forming the vacuum chuck, can be seen to be comprised of the vacuum tubing 43 secured by suitable fastening means 49 to opening 39b. The opening 39b is the entry to a conduit 39a formed internally of the arm 39 thereby coupling the vacuum tubing 43 to a vertically aligned cavity 39c. This cavity is appreciably enlarged at its lower end to communicate with a plurality of slender conduits 50a arranged in disc 50 in a regular matrix fashion in the same array as the array of openings provided in the jig or carrier 25, shown in FIGURE 3. The steps in the operation of glazing ceramic caps are as follows.

The working surface plate 32 (see FIG. 4) is provided with a cylindrical shaped pedestal 44 whose upper surface is provided with an aligning means 45 for accurately positioning a ceramic cap carrier 25. The aligning means may, for example, be a three-sided guide so as to properly align a loaded jig 25 within the alignment means in order to insure that the array of ceramic caps are in substantially exact alignment with the array of small openings 50a provided in the vacuum chuck means (see FIG. 4a). A hand-operated lever 51 extending from the front of the apparatus is moved vertically downward causing the vacuum chuck and apparatus (arm 39 and cylinder 40) to be moved vertically downward so as to be positioned immediately above the carrier means. Each of the small diameter conduits 50a (see FIG. 4a) is provided with a resilient member such as, for example, a resilient O-ring 52 at its lower opening which bears upon the surface of an associated ceramic cap 10 so as to make substantially firm surface contact therewith.

A sceond manually operable lever 59 which moves in a horizontal plane is moved in a first direction within such horizontal plane, opening drain means 41 and thereby allowing vacuum source 58 to be directly coupled through tubing 42, drain means 41, tubing 43 and the internal conduits within members 39 and 40 so as to reach the small diameter conduits 50a and thereby cause the ceramic caps to be firmly held by the vacuum against an associated resilient member or O-ring 52.

With the vacuum chuck in the operative position, lever 51 is now moved vertical downward causing the ceramic caps to be drawn upwardly and out of the openings 26 provided in their associated carrier 25 so that the ceramic caps are lifted with the lifting subsequent of the vacuum chuck.

The vacuum chuck, which now holds all of the ceramic caps which have been removed from the carrier 25, is then moved to a position immediately above the flame of Bunsen burner 35 so as to be heated by flame 35a. The movement of vacuum chuck from above the pedestal 44 to the position above the Bunsen burner 34 is performed by operating the rotatably mounted handle 53a secured to a substantially disc-shaped member 53 which, in turn, is secured to a shaft (not shown) and suitable linkage (not shown) for moving the vacuum chuck from station-to-station.

The empty carrier member 25 is then removed from pedestal 44 and replaced with a shallow dish 54 containing a glass powder arranged at a uniform thickness throughout the dish. This may be very easily carried out simply by depositing the glass powder within the shallow dish and then running a straight-edge or other suitable tool across the upper lip of the dish so as to smooth out the glass powder provided within the shallow dish. The depth of the glass powder is preferably less than 7 millimeters.

The glass powder employed may be any one of the types of materials described in copending U.S. patent applications Ser. No. 296,098, filed July 18, 1963 (now abandoned); Ser. No. 329,854, filed Dec. 11, 1963 and Ser. No. 554,863, filed June 2, 1966.

Since the specific characteristics of the glass are all set forth in great detail in the above mentioned copending applications, no specific compositions will be recited herein for purposes of simplicity, but it should be understood that the glass powder employed contains no binders or solvents since such constituents which will evaporate during the encapsulation process may be captured within the interior of the encapsulated housing and cause severe damage to the sensitive microcircuits contained therein. Also, the glass powder should be of a composition which has a substantially low softening point to enable the glazing as well as the encapsulation operation to be performed at low temperatures preferably well below 400° C. in order to avoid any damaging effects upon the encapsulated microcircuitry.

After the ceramic caps are heated to a sufficient temperature level, the vacuum chuck is moved by handle 53a to a position immediately above pedestal 44. The chuck is then lowered by moving operating lever 51 downward causing the vacuum chuck to move downwardly toward pedestal 44 upon which a shallow receptacle 54 containing glass powder 55 is positioned in a manner which can best be seen in FIGURES 5 and 6. The downward movement of operating handle 51 causes the ceramic caps which are held in position against the vacuum chuck by the vacuum to be urged under pressure into the glass powder 55. The heating phase is maintained for a time interval sufficient to heat the ceramic caps to a temperature level in the range from 400° C. to 800° C. and preferably at a temperature level of 500° C. The ceramic caps are maintained in surface contact with the glass powder for a time interval in the range from 0.5 second to 3 seconds. During this period of time the combined pressure and heat causes the glass powder to be fused so as to become glazed to the surfaces 11a (see FIG. 1) of the vacuum-held ceramic caps.

Figure 9:
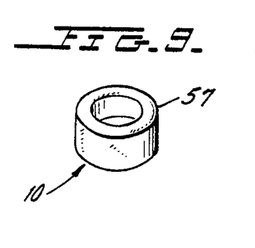
FIGURE 9 is a perspective view showing a plurality of ceramic caps which have been glazed in accordance with the method steps depicted in FIGURES 2–8.
Figure 9A:
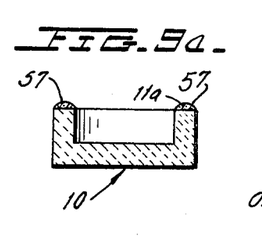
FIGURE 9a is a sectional view of the ceramic cap shown in FIGURE 9.

After the glazing operation is completed, lever 51 is moved upwardly causing the vacuum chuck to be moved upwardly and away from the glass powder 55. After the vacuum chuck has been lifted upwardly and away from the glass powder, the vacuum chuck is now moved by rotation of handle 53a to the position shown in FIGURE 7 so that it is immediately positioned above gravity feed bin 56. Once the vacuum chuck is positioned above the gravity feed bin 56 it is maintained in this position for a period in the range from 20 seconds to 2 minutes in order to allow the ceramic caps to cool. After the cooling interval is completed, manually operable lever 52 is moved in a horizontal plane in a direction away from bin 56 causing the drain means 41 to disconnect the vacuum source 58 from the vacuum chuck. The movement of operating lever 52 in the above mentioned direction also causes a lever 52a which is coupled through a shaft 52b to rotate with lever 52, to move in a horizontal plane immediately beneath the O-rings 52 (see FIG. 4a) so as to sweep or brush off the ceramic caps from the vacuum chuck assembly causing them to be dropped by gravity into the gravity feed bin 56 and downwardly through its inclined chute 56a into a clean glass receptacle in the manner shown in FIGURE 8, thereby producing glazed ceramic caps shown in FIGURE 9 in readiness for the next phase of the encapsulation operation. FIGURE 9a shows a sectionalized view of one ceramic cap 10 showing the glazed portions 57 which have been fused to the surface 11a of the cap.

Figure 10:
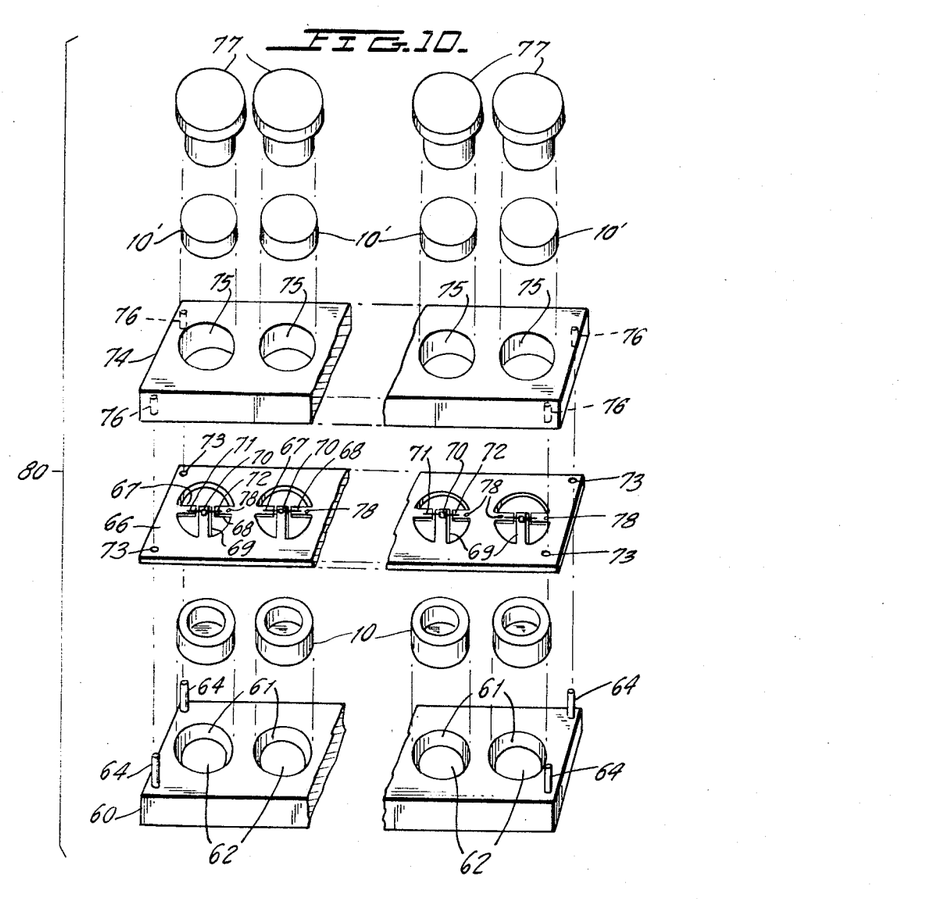
FIGURE 10 is a perspective exploded view showing the jigs employed in the final encapsulation process.

Having described the glazing operation, the final encapsulation operation is performed in the following manner:

FIGURE 10 shows an exploded view of the jig assemblies employed in the final encapsulation process.

Figure 10A:
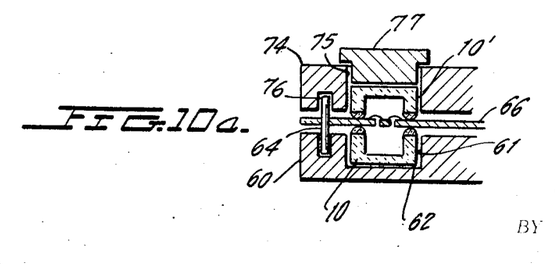
FIGURE 10a is a sectional view of a portion of the jigs of FIGURE 10, shown in the fully assembled position.

A jig or carrier member 60 comprised of an elongated metallic plate having a plurality of apertures 61 is loaded with ceramic caps 10, in a manner which can best be seen from a consideration of FIGURE 10a. The base of each opening 61 forms a seat for supporting upon the exterior surface of an associated ceramic cap 10. Whereas the jig 60 is shown in broken fashion, it should be understood that a large plurality such as 10 or 20 of the ceramic caps may be loaded into the jig which is provided with a corresponding number of openings therefor.

The jig is provided with a plurality of upwardly projecting pins 64 arranged at the corners thereof for keying purposes, to be more fully described.

The exemplary embodiment of FIGURE 10 shows a metallic plate 66 having a plurality of openings each containing three inwardly projecting fingers 67–69 which eventually form the electrode leads for a semiconductor device 70. The semiconductor device 70 which may, for example, be a diffused type transistor element, is mechanically and electrically secured to lead 69 which may be identified as the collector lead. The remaining leads 67 and 68 are connected to suitable points upon the upper surface of the transistor device by gold leads (for example) 71 and 72, respectively. Whereas the plate 66 is shown in partially broken fashion, it should be understood that its length is substantially equal to the jig 60 and that the openings are spaced at intervals substantially equal to the spaced intervals of the ceramic caps 10 provided in the base jig 60.

Plate 66 is provided with a plurality of openings 73 at the corners thereof to allow for simple straightforward alignment with the base carrier member 60. Plate 66 is positioned upon carrier 60 with pins 64 projecting through the opening 73.

An upper jig 74, preferably comprised of an elongated metallic plate having a plurality of openings 75 is positioned upon plate 66. Jig 74 is likewise keyed to the assembly by means of the openings 76 provided near the four corners thereof and which are designed to receive the projecting pins 64 which extend through the openings 73 in plate 66 and the openings 76 in jig 74. The openings 75 are arranged at spaced intervals equal to the spacing of the semiconductor devices and the spacing of the apertures 61 in jig 60.

The glazed ceramic caps 10' are then loaded into the openings 75 oriented in the manner shown in FIGURE 10a. The caps such as, for example, the caps 10 and 10', as shown in FIGURE 10a, are arranged with their cylindrical portions facing one another so as to eventually form an enclosed housing for the semiconductor device. After the loading of the ceramic caps 10' is completed, a plurality of substantially circular shaped weights 77 are placed within each opening 75 so as to bear upon the upper surface of the glazed ceramic caps 10', in the manner shown in FIGURE 10a. The weights are chosen so as to provide a suitable amount of pressure against the ceramic caps 10 and 10' during the encapsulation operation so as to insure a good hermetic seal.

Whereas the embodiment of FIGURE 10 shows the encapsulation of a single semiconductor device such as a transistor, it should be understood that the encapsulation operation may be performed in a substantially identical manner for other devices or for integrated circuits as the case may be. Also, whereas the embodiment shown in FIGURE 10 employs circular shaped ceramic caps, it should be understood that the caps may be square shaped, rectangular shaped or have any other shape which may be dictated by the configuration of the circuit components to be encapsulated.

In order to facilitate the identification of the electrode leads 67–69, one of these leads such as, for example, the leads 67 or 68 may be color coated with a colored dot 78 to easily and readily identify this lead as the base or emitter lead.

Figure 11:
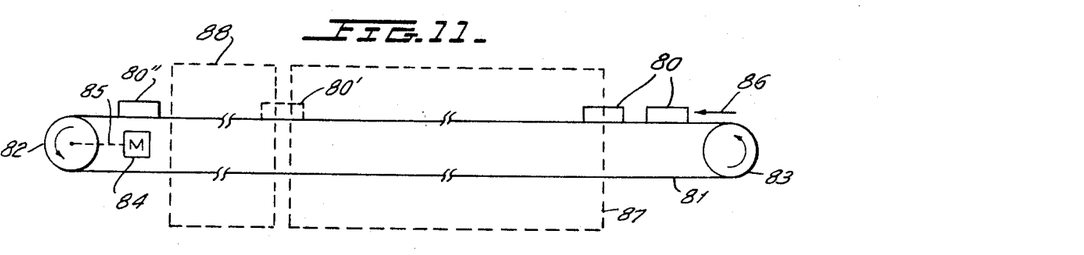
FIGURE 11 is a diagrammatic view showing the manner in which the heating and cooling phases of the final encapsulation operation is performed.

After each of the assemblies 80, shown in FIGURES 10 and 10a, are completed, they are then loaded upon a conveyor belt 81 as shown in FIGURE 11. The conveyor belt is wound about first and second rollers 82 and 83. Roller 82 is mechanically coupled to motor means 84 through suitable mechanical linkage such as gears or the like, designated by dotted line 85. The motor means 84 is adjustable so as to permit adjustments in the rate of travel of the conveyor belt 81. Roller 83 is rotatably mounted in such a manner as to freely rotate with the movement of the conveyor belt.

The assemblies 80 are loaded at the right-hand end of the conveyor belt and move in the direction shown by arrow 86 under control of the motor means 84. Moving from the right toward the left, the assemblies 80 enter into an oven or other suitable heating source 87 which subjects the assemblies to temperatures preferably in the range from 300°–400° and in any case, usually less than 400° so as to prevent any damage to the rather sensitive electronic circuits and/or devices. This low temperature, while insufficient to cause any damage to the electronic components and/or circuits, is nevertheless sufficient to cause fusion of the glazed surfaces in order to produce a hermetically sealed encapsulated device. The length of the oven, the temperature range and the rate of travel of the conveyor belt may all be adjusted in order to obtain optimum fusing conditions. In one preferred embodiment, the oven is comprised of a heating source which maintains a temperature within the enclosure and over substantially its entire length of 390° with the exception of the entrance to the oven. The rate of travel of the conveyor belt in one preferred embodiment for performing the sealing operation is adjusted to cause the assemblies to remain within the oven 87 for a period within the range from 5–15 minutes.

As the assemblies, such as for example assembly 80', leaves the heating station 87 it enters into a cooling station 88 which is provided with suitable water cooling means, fans or other blower means for cooling the completed encapsulations. It should be understood that the conveyor belt arrangement is of sufficient length and travels at a rate which is suitable to permit removal of the fused and cooled assembly such as, for example, the assembly 80" from the left-hand end of the conveyor belt.

Figure 12:
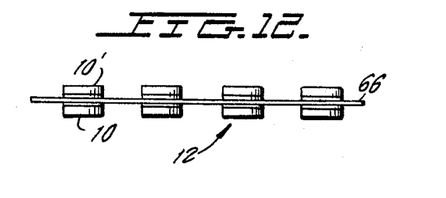
FIGURE 12 is an end view of a completed encapsulated structure.
Figure 12A:
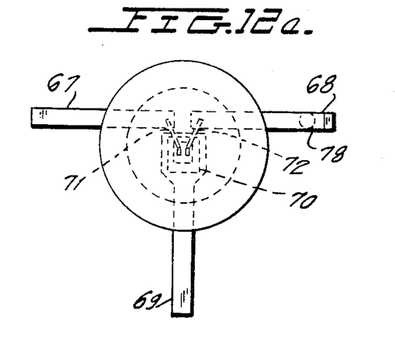
FIGURE 12a shows a top view of the final structure of said process.

After completion of the fusing and cooling operation, the completed structures are removed from the jigs 60 and 74 and are in the form shown in FIGURE 12. The completed structures of FIGURE 12 are eventually subjected to a stamping operation wherein the individual encapsulations are stamped away from plate 66 so that each individual structure has the appearance shown in FIGURE 12a.

Figure 13A:
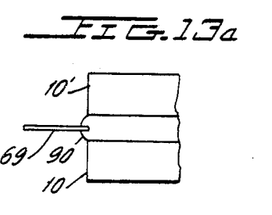
FIGURES 13a–13c are elevational views of a completed encapsulation assembly showing the manner in which a good hermetic seal along the glazed portion is determined.
Figure 13B:
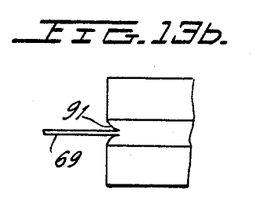
Figure 13C:
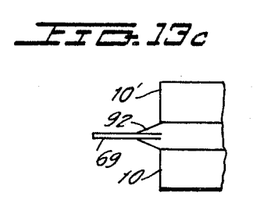

After completion of the encapsulation operation the individual structures are inspected, preferably under a microscope or other optical magnification means to determine whether an adequate seal has been obtained. FIGURES 13a–13c, which show portions of a completed assembly, indicate the exterior conditions which are found to occur when either a good or poor seal is obtained. FIGURE 13a shows a device in which a good seal has been obtained. In this case there is just a slight bulge 90 of the fused glass projecting beyond the vertical sides of the cap members 10 and 10' in the region of lead 69. This indicates that the temperature level is sufficient for producing an adequate seal.

FIGURE 13b shows the fused glass as having a slight indentation in the region of the electrode (69, for example) which is an indication that the temperature level in the heating cycle is too low and that an adjustment is required.

FIGURE 13c shows the fused glass projecting substantially beyond the vertical surfaces of the ceramic caps 10 and 10' in the region 92 adjacent an electrode (69, for example) which is an indication that the temperature level in the heating cycle of FIGURE 11 is too high and that a suitable adjustment is required. This inspection operation may be more advantageously performed before the individual structures are stamped from the plate 66 in order to greatly facilitate the handling operation.

The color coating 78 of the electrodes may be damaged during the heating process so that it is alternatively suggested that the color coating be performed after the inspection operation detailed above and in any case, after the heating operation. If desired, more than one of the electrodes projecting from the caps 10 and 10' may be color coated, depending only upon the needs of the user. Obviously, any variety of colors may be employed for color coating of the electrodes.

After all the above operations have been performed, including the stamping operation, a leak test is performed to determine whether the encapsulating assembly leaks. The performance of this test is comprised of the steps of immersing each of the individual structures into a suitable solution for effecting the leak test. One preferred solution presently available is sold under the trademark name "Red Check."

The individual structures are then removed from this solution after being immersed therein for a period preferably in the range from 15 minutes to 2 hours. When in the solution, the structures are placed under a suitable pressure. The pressure range is preferably from 1 to 6 atmospheres with the preferred level being approximately 4 atmospheres.

The individual structures are then removed from the elevated pressure medium and thoroughly washed in a solution of trichlorethylene. Those structures which exhibit a red color are clearly indicated as defective structures. The remaining structures which have successfully passed the leak test are then sorted in accordance with their electronic characteristics in the manner described in issued Patent No. 3,171,187, for the subsequent handling, shipping and use by the ultimate user.

Figure 14:
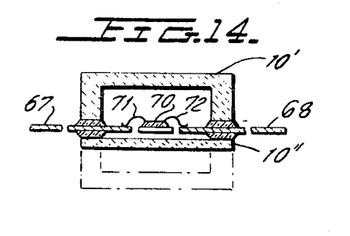
FIGURE 14 is a sectional view showing a completed assembly.

FIGURE 14 shows a sectionalized view of a completed structure. Whereas the completed structure shown therein is comprised of two cap members, it should be understood that the lower cap member may be replaced by a disc member 10" and described in detail in issued Patent No. 3,171,187 and in copending application Ser. No. 287,863, both previously mentioned above.

In the case where it is desired to glaze a disc member near its marginal periphery to enable it to be encapsulated with a cap member, the shallow dish containing the glass powder may be provided with a multiplicity of openings 54a (see FIGURE 4a) arranged in a regular matrix substantially identical to the arrangement of the cap members 10 in the jig 25. This arrangement causes the glass powder to drop through the matrix of openings enabling only the marginal peripheries of the disc members to be so glazed. A more detailed and enlarged showing of this arrangement is depicted in FIGURE 2 of copending application Ser. No. 287,863.

Whereas the entire assembly is shown arranged in a suspended fashion relative to its enclosing members, it is also possible to secure the assembly to the base member 10 (or disc 10") through the use of a cement or adhesive material such as, for example, low melting glasses or silver conductivity paints to secure the structure thereto. In the case where the structure is adhered to the member 10 (or 10") it is also possible to use a low melting point glass having substantially the same coefficient of expansion as the ceramic material to provide good securement of the device to the member 10 (or 10").

In the case where the semiconductor structure is suspended in the manner shown in FIGURE 14, the leads 67–69 are formed of a material having sufficient resiliency so as to absorb any impact suffered by the structure while at the same time having sufficient rigidity to prevent the structure from colliding with the interior surfaces of either of the encapsulation members 10' or 10. In the case where the structure is adhered to the lower member 10 (or 10") the cement or low melting point glass which is employed to adhere the structure to the base member prevents any collisions between the housing members (i.e., caps) and the structure itself by rigidly adhering the structure to its associated base member.

Figure 15:
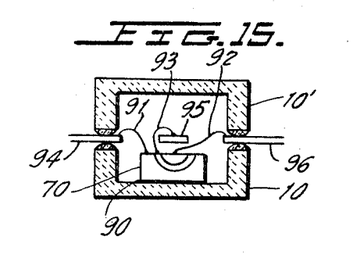
FIGURE 15 is a sectional view showing an alternative completed assembly.

FIGURE 15 shows a completed structure wherein the semiconductor wafer 70 is adhered to the base of a ceramic cap 10 by a suitable cement 90 and wherein all of the gold leads 91–93 are electrically connected to the top surface of the transistor device. These gold leads are, in turn, electrically connected and rigidly bonded to leads 94–96, respectively, which project outwardly from the encapsulating members 10 and 10'. The advantage of the embodiment of FIGURE 15 is such that, if any of the gold leads 91–93 were to droop, there is a possibly that they can make electrical contact with one another and thereby short circuit the transistor.

It can be seen from the foregoing that the instant invention provides a novel assembly line technique for glazing ceramic members and encapsulating miniaturized electrical components to provide an excellent hermetically sealed device capable of maintaining good operating characteristics for an indefinite period of time.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Apparatus for glazing housing members employed in the encapsulation of miniature electronic components comprising:
   a supporting assembly including heating means, loading means and delivery means being arranged at closely spaced intervals to facilitate rapid work transfer between said loading, heating and delivery means;
   movably mounted vacuum chuck means mounted on said supporting assembly for moving along a curved path above said heating, loading and delivery means;
   manually operable means for selectively moving said vacuum chuck means;
   a jig for receiving and positioning a plurality of said housing members in a predetermined array;
   said loading means including guide means for prepositioning said jig;
   said vacuum chuck means comprising a surface having a plurality of conduits arranged in an array substantially identical to the array provided in said jig;
   second manually operable means for urging said vacuum chuck means toward said loading means to move each of said conduits into alignment with an associated housing member when said vacuum means is positioned above said loading means and said jig is prepositioned upon said loading means and against said guide means;
   a vacuum source;
   valve means coupling said vacuum source to said vacuum chuck means;
   said valve means including third manually operable means for selectively coupling and decoupling said vacuum source from said vacuum chuck means.

2. The apparatus of claim 1 further comprising a shallow receptacle containing a low softening point glass powder of uniform thickness and being positioned upon said loading means subsequent to loading and heating of said housing members.

3. The apparatus of claim 1 wherein said delivery means is comprised of chute means having a wide opening at its upper end tapering to a narrower opening at its lower end:
   a receptacle positionable below said narrower opening for receiving glazed housing members dropped through said chute means when said vacuum chuck means is positioned above said delivery means and said vacuum source is decoupled from said vacuum chuck means.

4. The apparatus of claim 1 wherein said vacuum chuck menas is comprised of a vertically aligned shaft supporting said vacuum chuck means:
   means for rotating said shaft about its longitudinal axis;
   means for reciprocally moving said shaft along its longitudinal axis;
   said delivery, loading and heating means being arranged at spaced intervals along a curved path about said shaft.

5. The apparatus of claim 1 wherein the openings in said jig each have an inwardly directed shoulder for supporting a housing member.

6. Apparatus for glazing ceramic caps used in the process of hermetically sealing semiconductor bodies within mating ceramic caps by fusing the mating surfaces of said caps with a fusible glass powder, said apparatus comprising a supporting frame;
loading means positioned upon said frame for selectively positioning a plurality of ceramic caps thereon;
a heat source positioned upon said frame a spaced distance from said platform;
vacuum chuck means having multiple conduits for simultaneously lifting a plurality of caps;
first rotatable means mounted upon said platform for moving said vacuum chuck means substantially along a curved path to a first position above said loading means and a second position above said heat source;
container means for carrying a glass powder being positioned along said path;
said first means including second means for reciprocally moving said vacuum chuck along the axis of rotation of said first means to selectively move said vacuum chuck initially into engagement with caps positioned upon said platform and subsequently toward saaid container means to bring said caps into engagement with the glass powder;
control means for activating said vacuum chuck to cause the caps to cling to said vacuum chuck when it is raised above said platform.

7. The apparatus of claim 6 further comprising a gravity feed chute open at both ends; and being supported by said platform:
said first means being adapted to move from either said first or said second position to a third position above said gravity feed bin;
said control means being operable to deactivate said vacuum chuck causing the articles held against said vacuum chuck to drop by gravity into said bin.

8. The apparatus of claim 7 further comprising a rotatable arm positioned adjacent said chute for sweeping the surface of said vacuum chuck supporting said members when said chuck is in said third position to assure separation of said members from the deactivated vacuum chuck.

9. The apparatus of claim 6 wherein said vacuum chuck is comprised of a hollow housing having apertures along one surface communicating with the hollow interior of a first opening positioned along the opposite end of said housing communicating with the hollow interior for coupling a vacuum source thereto.

10. The apparatus of claim 9 further comprising a plurality of resilient O-rings each surrounding an associated aperture on the exterior of said housing to facilitate the holding force of said vacuum chuck in supporting articles engaging said O-rings when said vacuum chuck is activated by a vacuum source.

11. The apparatus of claim 10 wherein said first means is comprised of a rotatable shaft supporting said vacuum chuck;
means for rotating said shaft;
said second means including means for selectively raising and lowering said shaft.

References Cited

UNITED STATES PATENTS

| | | | |
|---|---|---|---|
| 2,149,246 | 2/1939 | Zimmerman et al. | 65—58 X |
| 2,191,951 | 2/1940 | Blau | 65—43 |
| 3,130,031 | 4/1964 | McMahon et al. | 65—155 |

FOREIGN PATENTS 1,210,205   9/1959   France.

DONALL H. SYLVESTER, *Primary Examiner.*

A. D. KELLOGG, *Assistant Examiner.*

U.S. Cl. X.R.

65—43, 58, 260; 117—217; 29—588, 589